Figure 1:
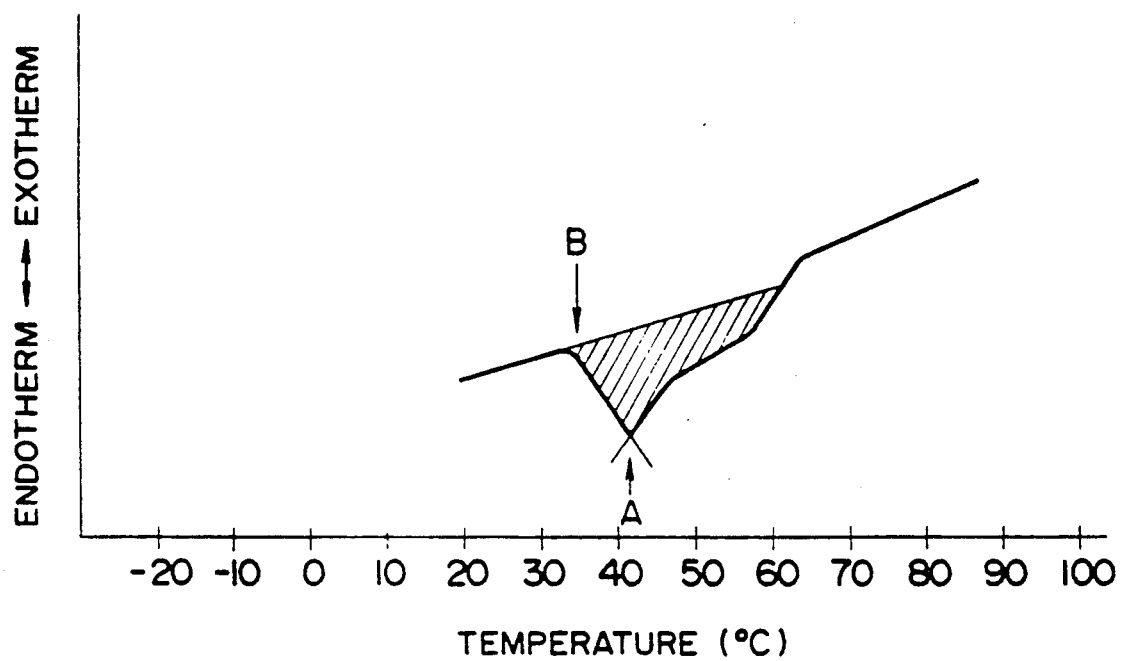

United States Patent [19]

Takao et al.

[11] Patent Number: 5,179,156
[45] Date of Patent: Jan. 12, 1993

[54] RUBBER COMPOSITION

[75] Inventors: Hiroyoshi Takao, Chiba; Hiroyuki Harada, Ichihara; Kiyoyuki Sugimori, Ichihara; Nobuyuki Yoshida, Ichihara; Masahiro Fukuyama, Chiba; Hideaki Yamada, Ichihara; Junichi Koshiba, Ichihara, all of Japan

[73] Assignee: Sumitomo Chemical Company, Limited, Osaka, Japan

[21] Appl. No.: 859,803

[22] Filed: Mar. 30, 1992

Related U.S. Application Data

[60] Division of Ser. No. 784,079, Oct. 30, 1991, Pat. No. 5,118,773, which is a continuation of Ser. No. 633,209, Dec. 31, 1990, abandoned, which is a continuation of Ser. No. 463,533, Jan. 11, 1990, abandoned, which is a continuation-in-part of Ser. No. 139,798, Dec. 30, 1987, abandoned.

[30] Foreign Application Priority Data

| Jan. 19, 1987 | [JP] | Japan | 62-10914 |
| Feb. 18, 1987 | [JP] | Japan | 62-36757 |
| Mar. 31, 1987 | [JP] | Japan | 62-80787 |
| Apr. 30, 1987 | [JP] | Japan | 62-109507 |
| Sep. 18, 1987 | [JP] | Japan | 62-235451 |

[51] Int. Cl.$^5$ .................. C08L 45/00; C08L 55/00
[52] U.S. Cl. ..................... 524/518; 524/570; 525/237; 525/331.7; 525/332.5
[58] Field of Search ..................... 524/518, 570

[56] References Cited

U.S. PATENT DOCUMENTS

| 3,291,780 | 12/1966 | Gladding et al. | 526/281 |
| 3,684,782 | 8/1972 | Langi et al. | 526/282 |
| 3,725,364 | 4/1973 | Wagensomma et al. | 526/282 |
| 3,894,999 | 7/1975 | Boozer et al. | 526/282 |
| 3,937,763 | 2/1976 | Ogura et al. | 526/282 |
| 4,125,699 | 11/1978 | Yamamoto et al. | 526/282 |
| 4,259,468 | 3/1981 | Kajuira et al. | 526/282 |
| 4,510,303 | 4/1985 | Oda et al. | 526/282 |
| 4,588,794 | 5/1986 | Oda et al. | 526/282 |

FOREIGN PATENT DOCUMENTS

| 0059034 | 9/1982 | European Pat. Off. |
| 50-44245 | 4/1975 | Japan |
| 55-137112 | 10/1980 | Japan |
| 55-137113 | 10/1980 | Japan |
| 57-65710 | 4/1982 | Japan |
| 59-27931 | 2/1984 | Japan |
| 60-42443 | 3/1985 | Japan |
| 75104243 | 1/1982 | Taiwan |
| 42445 | 3/1982 | Taiwan |
| 44471 | 6/1982 | Taiwan |
| 7012091 | 1/1983 | Taiwan |
| 101301 | 7/1988 | Taiwan |
| 111603 | 4/1989 | Taiwan |
| 1192770 | 5/1970 | United Kingdom |

OTHER PUBLICATIONS

Nitrile Rubber/EPDM Graft Blends—May 23, 1980.

*Primary Examiner*—Edward J. Smith
*Attorney, Agent, or Firm*—Stevens, Davis, Miller & Mosher

[57] ABSTRACT

Herein is disclosed a vulcanizable rubber composition comprising a copolymer rubber constituted of ethylene, propylene and nonconjugated polyene, wherein ethylene/propylene molar ratio is 78/22 to 97/3 and the total content of propylene and nonconjugated polyene is 6 to 30% by mole in said copolymer rubber. By the use of the rubber composition of the present invention, a vulcanized product excellent in tensile strength, heat resistance, oil resistance, compression set resistance and flex behavior can be obtained. The vulcanized product can be used as automobile parts and other innumerable articles such as socket cover, heat resistant hose, electric wire, condenser cap, heat resistant belt, vibration-proof rubber, hoses, weather strip, seal sponge, black side wall of tire, etc.

11 Claims, 1 Drawing Sheet

RUBBER COMPOSITION

CROSS-REFERENCE TO RELATED APPLICATIONS

This is a division of application Ser. No. 07/784,079, filed Oct. 30, 1991, now U.S. Pat. No. 5,118,773 which in turn is a continuation of application Ser. No. 07/633,209, filed Dec. 31, 1990, now abandoned, which in turn is a continuation of application Ser. No. 07/463,533, filed Jan. 11, 1990, now abandoned, which in turn is a continuation-in-part of application Ser. No. 07/139,798, filed Dec. 30, 1987, now abandoned.

The present invention relates to a vulcanizable rubber composition comprising a copolymer rubber constituted of ethylene, propylene and nonconjugated polyene wherein molar ratio of ethylene to propylene is 78/22 to 97/3 and total content of propylene and nonconjugated polyene is 6 to 30% by mole.

Concerning the rubbery copolymer constituted of ethylene, α-olefin and nonconjugated polyene, a number of proposals have already been made. Among them, rubbery copolymers constituted of ethylene, propylene and nonconjugated polyene are watched with the greatest interest from the industrial point of view.

According to the prior art, the rubbery region of this type of copolymers is mostly constituted of a material of which ethylene/propylene ratio is 85/15 by mole or below.

However, such ethylene/propylene/nonconjugated polyene copolymers are insufficient in the strength of copolymer and their vulcanized products are insufficient in strength and hardness, so that they have not been used largely in the fields requiring high performance (strength) and high hardness.

It has generally been believed that copolymers having too high an ethylene content, i.e. those of which ethylene/propylene ratio exceeds 85/15 by mole, are disadvantageous in that they form a solvent-insoluble gel in the process of polymerization and, even if they give a copolymer, the copolymer is rigid, poor in elasticity and inferior in strength (for example, see: Japanese Patent Application Kokai (Laid-Open) Nos. 55-137,112 and 55-137,113).

Further, it is known that ethylene-propylene copolymer rubbers containing no polyene are desirable for use in the fields requiring a high heat resistance. However, this sort of ethylene-propylene copolymer rubbers containing no polyene are disadvantageous in that they cannot be fully crosslinked with organic peroxide and the like in the presence of steam or air.

Further, since this sort of ethylene-propylene copolymer rubbers have no polar group in their main chain, they are not always satisfactory in oil resistance. Thus, no prior art has been able to give an ethylene-propylene copolymer rubber composition capable of solving all the above-mentioned problems As compared with vulcanized rubber products vulcanized with sulfur, crosslinked rubber products crosslinked with an organic peroxide (hereinafter simply referred to as peroxide) are characterized in that the latter are excellent in thermal aging resistance, small in compression set, low in staining property onto metallic and coated surfaces and capable of giving a colored rubber product relatively insusceptible to coloration at the time of crosslinking reaction and color change after longterm use, and owing to these characteristic features they have been applied to automobile parts, industrial parts, rubber materials for construction, electrical insulating materials, etc. However, these peroxide-crosslinked rubber products are manufactured by performing the crosslinking reaction in an air-free atmosphere such as the space in the die of hot press or injection molding machine or in a fused metallic salt, and heating apparatuses worked in the presence of air such as hot air heating apparatus, high frequency heating apparatus, fluidized bed heating apparatus and the like are not applicable to their manufacture. This is for the reason that, if a peroxide-crosslinking reaction is carried out in the presence of air or in a heating apparatus worked in the presence of air, the surface of the crosslinked rubber product thus obtained exhibits a remarkable stickiness and hence the product has no commercial value. When the crosslinking reaction is carried out by means of a steam still type heating apparatus, the air in the vulcanizer must be replaced and expelled with steam used as heat source so that this method is much limited in practicability.

According to the prior art, the low ozone resistance, low weather resistance and low heat resistance of conjugated diene polymer rubbers and conjugated diene copolymer rubbers such as butadiene rubber, isoprene rubber, styrene-butadiene rubber and the like have been compensated by blending and vulcanizing them together with EPDM having outstanding performances in these properties.

Inversely, the above-mentioned conjugated diene polymer rubbers or conjugated diene copolymer rubbers are sometimes blended into EPDM in order to compensate the defects of EPDM such as the low adhesive property.

Practical examples of blended product of EPDM and conjugated diene polymer rubber or conjugated diene copolymer rubber having improved ozone resistance, weather resistance, heat resistance and adhesive property include window frame, heat resistant hose, etc. However, according to this technique, mechanical strength of the blend rubber is lower than the arithmetic mean value of the mechanical strengths of the two component rubbers, and this is an important disadvantage from the practical point of view.

The above-mentioned disadvantage is attributable to that both the rubbers used therein are poor in mutual solubility and hence lack in mutual interaction and that the blended product of the two components cannot be co-vulcanized evenly because solubilities of vulcanizing agent and vulcanization accelerator in one component are different from those in the other component.

In order to solve the above-mentioned problems, many studies have been conducted so far. For example, the use of a long chain alkyl type accelerator was proposed in Japanese Patent Application Kokai (Laid-Open) No. 50-44245. However, such a method could not give any satisfactory result. Thus, there has been known no means for solving the above-mentioned problems in the prior art.

Finally, one of the most important objects of the present invention is described below.

One of the most important object of the present invention is to provide a rubber composition having a good roll processability as well as desirable properties that solve the above-mentioned technical problems. Roll processability of rubbers is one of the most decisive factors in processing rubbers. Therefore, improving the roll processability is a matter of primary concern in rubber industry. Here, the term "rubber composition of good processability" refers to that a rubber composition quickly winds around kneading rolls and thereafter hardly cause bagging (in the art, the term "bagging" refers to getting off of rubber wound around rolls from the rolls). Such a requirement has recently been getting severer for accelerating the processing of rubbers and for improving and uniformalizing the quality of the products. However, none of the conventional rubber compositions known have a satisfactorily good rool processability.

Accordingly to the present invention, there is provided a vulcanizable rubber composition comprising an ethylene/propylene/nonconjugated polyene copolymer satisfying the following requirements simultaneously:

(1) The rubber composition and its vulcanized rubber are excellent in properties such as elasticity, tensile strength, tear strength, heat resistance, oil resistance, and the like.

(2) The rubber composition can be vulcanized even in the presence of steam or air.

(3) When crosslinking reaction is carried out by using a peroxide as crosslinking agent by means of a heating apparatus worked in the presence of air, the surface of crosslinked rubber exhibits no stickiness.

(4) The rubber composition can be blended and co-vulcanized with a conjugated diene polymer and/or a copolymer of conjugated diene and α-olefin or an aromatic vinyl compound.

(5) The rubber composition and its vulcanized rubber are excellent in roll processability.

With the air of achieving the above-mentioned object, the present inventors conducted many studies to discover an ethylene/propylene/nonconjugated polyene copolymer rubber satisfying the above-mentioned requirements. Based on this discovery, the present invention was accomplished.

Thus, according to the present invention, there is provided a vulcanizable rubber composition comprising a copolymer rubber constituted of ethylene, propylene and nonconjugated polyene, wherein ethylene/propylene molar ratio is 78/22 to 97/3 and total content of propylene and nonconjugated diene is 6 to 30% by mole.

Also, according to the present invention, there is provided an ethylene-α-olefin copolymer consisting essentially of ethylene, propylene and nonconjugated polyene, wherein ethylene/propylene molar ratio is 78/22 to 97/3, the total content of propylene and nonconjugated polyene is 6 to 30% by mole, A defined by the following equation:

$$A = \frac{42P + 120D}{42P + 120D + 28E}$$

[Each of P, D and E represents the content (% by mole) of propylene, nonconjugated polyene and ethylene, respectively, in the copolymer] satisfies $A \geq 0.1$ and the copolymer has an intrinsic viscosity of 0.8 to 4.0 dl/g as measured at 70° C. in xylene, a melting peak temperature of 70° C. or below and a heat quantity of melting of 10 cal/g or below as measured with a differential scanning calorimeter.

FIG. 1 is a melting curve of the copolymer rubber obtained in Example 1 measured by DSC, wherein A is the peak temperature of melting, B is the starting temperature of melting, and the area of the shaded part corresponds to the heat quantity of melting.

Specific examples of the nonconjugated polyene used in the invention include 1,4-hexadiene, dicyclopentadiene, methyldicyclopentadiene, vinylnorbornene, 5-ethylidene-2-norbornene, isopropenylnorbornene and the like, among which dicyclopentadiene and 5-ethylidene-2-norbornene are preferable. The content of the polyene compound is preferably in the range of 0.3 to 8% by mole and more preferably 3 to 6% by mole. If the content of polyene compound is higher than 8% by mole, there is little improvement in effect with a useless rise in cost.

In order to remarkably improve the roll processability of the rubber composition, which is one of the most important objects of the present invention, the rubber composition of the present invention contains 3 to 6% by mole of a nonconjugated polyene. The content less than 3% by mole is not preferable because the necessary time for sufficient winding of the rubber composition around rolls is not satisfactorily short and there tends to be caused the so-called bagging, i.e. the rubber composition wound around the rolls tends to get off from the rolls. Shortening the necessary time for sufficient winding of the rubber composition around rolls greatly improves the efficiency of roll processing. In contrast, the bagging not only notably reduces the efficiency of roll processing but also ununiformalizes the quality of the product. In the worst case, it even makes the roll processing impossible.

In the invention, ethylene/propylene molar ratio is in the range of 78/22 to 97/3. If the ethylene/propylene molar ratio is smaller than the above-mentioned range, strength of the copolymer including tensile strength and tear strength tends to be low. If the ethylene/propylene molar ratio is greater than the above-mentioned range, the copolymer tends to be rigid and poor in elastic nature. Thus, the ethylene/propylene molar ratio is preferably in the range of 90/10 to 97/3 and more preferably in the range of 86/14 to 97/3.

According to the present invention, the total content of propylene and nonconjugated polyene in the copolymer rubber is in the range of 6 to 30% by mole, preferably 6 to 20% by mole, and more preferably 6 to 17% by mole.

In the present invention, value A defined by the following equation is desired to satisfy $A \geq 0.1$ and preferably $A \geq 0.12$:

$$A = \frac{42P + 120D}{42P + 120D + 28E}$$

wherein each of P, D and E represents the propylene content, the nonconjugated polyene content and the ethylene content, respectively, all in terms of % by mole, in an ethylene/propylene/nonconjugated polyene copolymer rubber.

If A is smaller than 0.1, it tends to be relatively difficult to obtain a copolymer rubber having so high an ethylene content as in the present invention, and the formed copolymer rubber obtained tends to be rigid, poor in elastic property and low in processability. When $A \geq 0.1$ is satisfied, the velocity of vulcanization becomes relatively high and the properties of vulcanized product becomes relatively good.

The process oil used in the invention is selected from paraffin type, naphthene type and aroma type process oils conventionally used in the rubber industry. It may be selected arbitrarily with consideration of cost.

The process oil may be incorporated into the composition in any amount, in accordance with the intended properties of composition. The process oil is used preferably in an amount of 10 to 150 parts by weight and more preferably 10 to 80 parts by weight per 100 parts by weight of the copolymer rubber.

Preferably, said aroma type process oil contains the aroma component in an amount of 35% or more and has a viscosity-specific gravity constant (V.G.C.) of 0.95 or above as calculated according to the following equation:

$$V.G.C. \text{ (viscosity-specific gravity constant)} = \frac{G - 0.24 - 0.022 \log(V_1 - 35.5)}{0.755}$$

wherein G is specific gravity of oil at 60° F. and $V_1$ is viscosity (SUS) of oil at 210° F.

The inorganic filler used in the invention is not critical. Specific examples of the inorganic filler include white colored fillers such as silica, talc, clay and the like. The inorganic filler may be used either alone or in the form of a mixture of two or more members.

In the invention, carbon black may be used either alone or in combination with one or more inorganic fillers.

The compounding ratio of said inorganic filler and/or carbon black to copolymer rubber may be arbitrarily selected in accordance with the intended properties of the composition. The inorganic filler and/or carbon black is used usually in an amount of 20 to 400 parts by weight, preferably 40 to 400 parts by weight, more preferably 40 to 150 parts by weight and most preferably 50 to 100 parts by weight per 100 parts by weight of the copolymer rubber.

The copolymer of the present invention preferably has an intrinsic viscosity of 0.8 to 4.0 dl/g and more preferably 1.0 to 3.0 dl/g as measured at 70° C. in xylene. When the intrinsic viscosity is in this range, the composition tends to exhibit excellent properties and its processing is relatively easy to carry out. If the intrinsic viscosity is lower than 0.8 dl/g, properties of composition tend to be inferior. If the intrinsic viscosity is higher than 4.0 dl/g, the processability of composition tends to be deteriorated.

The copolymer of the present invention are so excellent in mechanical properties that its strength at break is 40 kg/cm² or above and elongation at break is 200 to 1,500% as measured according to JIS K 6301.

Such an ethylene copolymer has been quite difficult to produce industrially according to the conventional polymerization processes hitherto known. This is for the following reason. That is, a copolymer of high ethylene content is usually produced by enhancing the ethylene concentration in the reaction medium, and under such a condition a polymer insoluble or only poorly soluble in solvent, i.e. gel, is largely formed which clogs the inner space of reactor and often obstructs a stable operation.

The present inventors studied a method for obtaining a copolymer having a high ethylene content, exhibiting a rubber elasticity and having a high strength without formation of gel. At the result, it was found that the above-mentioned object can be achieved by combining a specified catalyst system with specified polymerization conditions. Based on this finding, the copolymer rubber of the invention can be obtained.

That is to say, the ethylene/propylene/non-conjugated polyene copolymer rubber of the present invention can be obtained by using a catalyst soluble in hydrocarbon solvents composed of a vanadium (having tri-, tetra- or pentavalene) compound, an organoaluminum compound and an ester of halogenated organic acid.

Specific examples of the vanadium compound used in the invention include vanadium oxytrichloride; vanadium tetrachloride; vanadate compounds represented by $VO(OR)_n X_{3-n}$ ($0 < n \leq 3$; R represents a straight chain, branched chain or cyclic hydrocarbon residue having 1 to 10 carbon atoms; and X represents halogen) such as $VO(OCH_3)_3$, $VO(OCH_3)_2Cl$, $VO(OCH_3)Cl_2$, $VO(OC_2H_5)_3$, $VO(OC_2H_5)_2Cl$, $VO(OC_2H_5)Cl_2$, $VO(OC_3H_7)_3$, $VO(OC_3H_7)_2Cl$, $VO(OC_3H_7)Cl_2$, $VO(OC_4H_9)_3$, $VO(OC_4H_9)_2Cl$, $VO(OC_4H_9)Cl_2$, $V(acac)_3$ (acac represents acetylacetone); $VCl_3 \cdot nROH$ ($1 < n \leq 3$; $R_1$ represents alkyl group having 1 to 10 carbon atoms), and the like. They are used either alone or in the form of a mixture.

The organoaluminum compound is usually a compound represented by the following general formula:

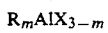

$$R_m AlX_{3-m}$$

wherein $0 < m \leq 3$; R represents alkyl group having 1 to 10 carbon atoms; and X represents halogen. Specific examples of said organoaluminum compound include $(C_2H_5)_{1.5}AlCl_{1.5}$, $(C_2H_5)_2AlCl$, $(C_4H_9)_3Al$, $(C_4H_9)_2AlCl$, $(C_4H_9)_{1.5}AlCl_{1.5}$, $(C_6H_{13})_3Al$, $(C_6H_{13})_2AlCl$ and the like. They may be used either alone or in the form of a mixture.

Specific examples of said ester of halogenated organic acid include methyl trichloracetate, ethyl trichloracetate, propyl trichloracetate, methyl perchlorocrotonate, ethyl perchlorocrotonate, butyl perchlorocrotonate, and the like. They may be used either alone or in the form of a mixture.

The quantitative ratios between the organoaluminum compound, vanadium compound and halogenated organic acid ester can be varied in a wide range. The ratio of organoaluminum compound to halogenated organic acid ester is preferably 100:1 to 2:1 and more preferably 100:1 to 3:1, both by mole. The ratio of halogenated organic acid ester to vanadium compound is preferably in the range of 0.1:1 to 100:1. The ratio of organoaluminum compound to vanadium compound is preferably in the range of 1,000:1 to 3:1. The ratio of organoaluminum compound to the sum of halogenated organic acid ester and vanadium compound is preferably in the range of 100:1 to 2.1:1 by mole.

The polymerization reaction for obtaining the copolymer rubber of the present invention is carried out according to a solution polymerization process using a conventional solvent. The solvents usable in this polymerization reaction include aliphatic hydrocarbons such as pentane, hexane, heptane, octane, kerosene and the like; alicyclic hydrocarbons such as cyclohexane and the like; aromatic hydrocarbons such as benzene, toluene, xylene and the like; and halogenated hydrocarbons such as chloroform, trichlorethylene, tetrachlorethane and the like. These solvents may be used either alone or in the form of a mixture.

Although the temperature of the polymerization can be varied in a wide range, it is usually in the range of −50° C. to +100° C., preferably in the range of −30° C. to +80° C., and more preferably in the range of +30° C. to +80° C. The polymerization is carried out under an atmospheric pressure or an elevated pressure, and preferably under a pressure of 1 to 50 kg/cm$^2$.

In the above-mentioned production processes, a conventional molecular weight regulator may be used for the purpose of controlling the molecular weight of the resulting polymer. As the molecular weight regulator, diethylzinc, allyl chloride, pyridine-N-oxide, hydrogen and the like are usually used, among which hydrogen is preferable.

Generally, ethylene/propylene/nonconjugated polyene copolymers have the so-called microcrystals. The copolymer of the present invention also contains such microcrystals. The existence of microcrystal can be confirmed by means of differential scanning calorimeter (DSC). The preferable microcrystal state in the copolymer of the present invention is defined as follows by DSC measurement.

That is, the microcrystal of the copolymer of the present invention has a melting peak temperature of 70° C. or below, preferably 65° C. or below and more preferably 60° C. or below and a heat quantity of melting of 10 cal/g or below, preferably 1.5 to 10 cal/g and more preferably 1.5 to 6 cal/g) as measured by DSC.

If the melting peak temperature is higher than 70° C., the copolymer is apt to become resinous. If the heat quantity of melting is higher than 10 cal/g, the copolymer tends to be rigid and resinous. If the heat quantity of melting is lower than 1.5 cal/g, the strength of raw rubber tends to be low.

The DSC measurement is carried out under the following conditions:

DSC: DSC-Model 2 (manufactured by Perkin Elmer Co.)

Temperature elevation speed: 20° C./min.

Sensibility: 0.5 mcal/sec.

Atmosphere: He.

In the present invention, the melting peak temperature and the heat quantity of melting were determined from the endotherm peak in the DSC melting curve. A typical example of the curve is shown in FIG. 1.

FIG. 1 is an example of the DSC melting curve of the copolymer rubber obtained in Example 1 mentioned later, from which the melting peak temperature and the heat quantity of melting were determined in the following manner:

(1) The intersecting point (A) between the two tangent lines of the endotherm (melting) peak was taken as the melting peak temperature.

(2) Over a base line passing the starting point (B) of endotherm (melting) peak, the area of shaded part was evaluated by the integration and taken as the heat quantity of melting.

Although the copolymer rubber used in the present invention may be put to use in the form of a single substance, it may also be put to use in the form of a blended mixture with other rubbers. Although the rubber to be blended therewith is not critical, conjugated diene copolymers and/or copolymers of conjugated diene and a-olefin or an aromatic vinyl compound are preferable. More preferable rubbers are butadiene rubber, isoprene rubber, natural rubber, styrene-butadiene rubber and nitrile-butadiene rubber, among which natural rubber and butadiene rubber are most preferred. Of these rubbers, one or more members may be used for blending.

The amount of said rubber used for blending is not critical. Preferably, 1 to 10,000 parts by weight thereof is blended and more preferably 1 to 250 parts by weight thereof is blended into 100 parts by weight of the copolymer rubber.

The copolymer of the present invention can be vulcanized in the same manner as for conventional ethylene/propylene/nonconjugated polyene copolymer rubbers. As the vulcanizing agent, peroxides, sulfur and the like are usable.

In the case of sulfur vulcanization, sulfur is used in an amount of 0.1 to 10 parts by weight and preferably 0.5 to 5 parts by weight per 100 parts by weight of the copolymer. If desired, one or more vulcanization accelerators may be used.

The organic peroxides which can be used in the invention include peroxy ketal type, hydroperoxide type, dialkyl peroxide type, diacyl peroxide type, peroxy ester type and the like. Specific examples of the organic peroxide include 1,1-bis(t-butylperoxy)-3,3,5-trimethylcyclohexane, dicumyl peroxide, di-t-butylperoxide, t-butylperoxy cumene, benzoyl peroxide, 2,5-dimethyl-2,5-di(t-butylperoxy)hexane and the like. The organic peroxide is selected with consideration of the type of rubber used, the safety in handling, the odor, etc. The organic peroxide is used in an amount of 0.5 to 20 parts by weight and preferably 1 to 10 parts by weight per 100 parts by weight of the base rubber, and its amount is appropriately increased or decreased in accordance with the intended properties of the cross-linked rubber product to be produced.

Specific examples of the vulcanization assistant usable in the present invention include diphenylguanidine, mercaptobenzothiazole, N-cyclohexylbenzothiazyl sulfenamide, mercaptobenzothiazole zinc salt, sodium dimethyldithiocarbamate and the like which are all well known in the rubber industry.

In the case of peroxide vulcanization, p,p'-dibenzoyl quinone dioxime, quinone dioxime, triallyl cyanurate, sulfur, ethylene dimethacrylate, N,N'-m-phenylene bismaleimide, triallyl isocyanurate, trimethylolpropane trimethacrylate and the like may be added as a vulcanization assistant in addition to the above-mentioned ones.

In carrying out the vulcanization, activator, dispersant, plasticizer, stickiness improver, colorant, foaming agent, anti-aging agent, and other additives may be used similarly to the case of usual EPDM.

The anti-aging agents used in the present invention include 2-mercaptobenzimidazole, trinonylphenyl phosphite, 2,6-di-t-butyl-4-methylphenol, 1,1-bis(4-hydroxyphenyl)cyclohexane, N-phenyl-N'-isopropyl-p-phenylenediamine and the like which are all well known as conventional anti-aging agent or antioxidant in the rubber industry.

If desired, the copolymer rubber is compounded with other additives such as a process oil, an inorganic filler, carbon black, a conjugated diene polymer, a copolymer of conjugated diene and α-olefin or an aromatic vinyl compound, a crosslinking agent, and the like, and the compounding can be put into practice by the usual kneading process using Banbury mixer, roll or the like.

The uncrosslinked rubber composition obtained by the above-mentioned compounding process is then formed into the desired molded product by a preliminary molding. This molding is carried out by an appropriate means so far known such as extruder, press, roll, etc.

As the method of vulcanization, sulfur vulcanization and peroxide vulcanization are both adoptable. By the process of usual press vulcanization or continuous vulcanization, a vulcanized product can be obtained.

Further, unlike the prior techniques where only heating apparatuses worked in the absence of air such as hot press, fused metallic salt bath and the like are usable as the vulcanizing apparatus, the present invention is free from such a restriction and can carry out the crosslinking reaction by means of various heating apparatuses worked in the presence of air such as hot air heating apparatus, high frequency heating apparatus, fluidized bed heating apparatus and the like.

Further, in the present invention, vulcanization can be carried out even under an elevated air pressure in order to prevent the foaming taking place in the hot air heating apparatus.

Further, even in a steam still type heating apparatus which becomes usable in the prior techniques only after replacing the air from the inner space with steam used as heat source, the present invention enables to carry out crosslinking reaction without such a restriction. Further, if desired, crosslinking can be achieved by the combined use of two or more kinds of heating apparatuses, such as the combination of hot air heating apparatus and high frequency heating apparatus, for example.

Further, the rubber composition of the present invention can give a crosslinked rubber product by the so-called continuous vulcanization process which is a combination of an extruder or the like and the abovementioned heating apparatus, unlike the prior techniques where such a combined use has been impossible to be realized.

Temperature and duration of the crosslinking reaction are decided with consideration of the properties of rubber composition to be used and the properties of crosslinked product.

By the use of the rubber composition of the present invention, a vulcanized product excellent in tensile strength, heat resistance, oil resistance, compression set resistance and flexing characteristics can be obtained.

This vulcanized product can be used as automobile parts and other innumerable articles such as socket cover, heat resistant hose, electric wire, condense cap, heat resistant belt, oscillation-proof rubber, packings, hoses, weather strip, seal sponge, black side wall of tire, and the like.

Next, the present invention will be illustrated in more detail with reference to the following Examples and Comparative Examples, which do not limit the scope of the invention.

EXAMPLE 1

Into a 10 liter autocalve made of stainless steel and equipped with a stirrer, hexane (10 kg/hour), ethylene (0.45 kg/hour), propylene (0.50 kg/hour) and 5-ethylidene-2-norbornene (hereinafter referred to as ENB) (0.15 kg/hour) were fed at the mentioned rates from the bottom part of the autoclave and hydrogen was fed at a rate of 0.162% by mole. Further, as catalyst, ethylaluminum sesquichloride, vanadyl trichloride and n-butyl perchlorocrotonate were continuously fed at a rate of 0.5 g/hour, 0.032 g/hour and 0.15 g/hour, respectively.

Polymerization reaction was carried out in the state of homogeneous solution at a temperature of 50° C. The reacted liquid mixture was continuously withdrawn. After adding a polymerization stopper thereto, the resulting copolymer was deposited by steam stripping and then dried.

Thus, a copolymer was obtained in a yield of 320 g/hour.

The copolymer thus obtained had an ethylene/propylene molar ratio of 93/7. Its ENB content was 4.5% by mole, its A value was 0.248, and its intrinsic viscosity was 1.63 dl/g. The ethylene content and ENB content were measured by infrared spectroscopy.

As measured by DSC, its melting peak temperature was 42° C. and its heat quantity of melting was 5.6 cal/g.

As measured according to JIS K 6301, this copolymer had a strength at break of 150 kg/cm$^2$ and an elongation at break of 630%. Its JIS A hardness was 64.

A copolymer composition having the formulation of Table 1 was press-vulcanized at 160° C. for 15 minutes, and properties of the vulcanizate thus obtained were measured according to JIS K 6301.

Results of the measurements of properties are summarized in Table 2.

EXAMPLE 2

A polymerization reaction was carried out in the same manner as in Example 1, except that hexane, ethylene, propylene and ENB were fed at a rate of 7 kg/hour, 0.51 kg/hour, 0.41 kg/hour and 0.15 kg/hour, respectively. Hydrogen was fed at a rate of 0.162% by mole.

As catalyst components, ethylaluminum sesquichloride, vanadium oxytrichloride and n-butyl perchlorocrotonate were fed at a rate of 0.4 g/hour, 0.023 g/hour and 0.11 g/hour, respectively. The polymerization temperature was 50° C.

Thus, a copolymer was obtained in a yield of 350 g/hour.

The copolymer thus obtained had an ethylene/propylene ratio of 97/3 by mole, an ENB content of 4.5% by mole, an A value of 0.203 and an intrinsic viscosity of 1.64 dl/g.

As measured by DSC, its melting peak temperature was 41° C. and its heat quantity of melting was 5.3 cal/g.

COMPARATIVE EXAMPLE 1

A polymerization reaction was carried out in the same manner as in Example 1, except that hexane, ethylene and ENB were fed at a rate of 10 kg/hour, 0.6 kg/hour and 0.11 kg/hour, respectively, and hydrogen was fed at a rate of 0.09% by mole.

As catalyst components, ethylaluminum sesquichloride, vanadium oxytrichloride and n-butyl perchlorocrotonate were fed at a rate of 0.30 g/hour, 0.015 g/hour and 0.05 g/hour, respectively. The polymerization temperature was 50° C. In this experiment, a large amount of insoluble substance was formed in the polymerization reactor, so that no stable polymerization could be continued.

The ethylene/nonconjugated polyene copolymer thus obtained was a resinous substance. The copolymer had an ENB content of 4% by mole and an A value of 0.14. Its melting peak temperature was 88° C. as measured by DSC.

COMPARATIVE EXAMPLE 2

The procedure of Example 1 was repeated, except that hexane, ethylene, propylene and ENB were fed at a rate of 10 kg/hour, 4.7 kg/hour, 8.9 kg/hour and 0.18 kg/hour, respectively, and hydrogen was fed at a rate of 0.102% by mole.

As catalyst components, ethylaluminum sesquichloride, vanadium oxytrichloride and n-butyl perchlorocrotonate were fed at a rate of 1.1 g/hour, 0.05 g/hour and 0.27 g/hour, respectively. The polymerization temperature was 50° C.

Thus, a copolymer was obtained in a yield of 390 g/hour.

COMPARATIVE EXAMPLE 3

The procedure of Example 1 was repeated, except that hexane, ethylene, propylene and ENB were fed at a rate of 7 kg/hour, 0.39 kg/hour, 0.98 kg/hour and 0.03 kg/hour, respectively, and hydrogen was fed at a rate of 0.05% by mole.

As catalyst components, ethylaluminum sesquichloride, vanadium oxytrichloride and n-butyl perchlorocrotonate were fed at a rate of 1.2 g/hour, 0.06 g/hour and 0.3 g/hour, respectively. The polymerization temperature was 50° C.

Thus, a copolymer was obtained in a yield of 490 g/hour.

The copolymers obtained in Example 2 and Comparative Examples 2 and 3 were formulated and vulcanized in the same manner as in Example 1, and properties of the vulcanized products were measured.

The results of the measurements are summarized in Table 2.

TABLE 1

| | | |
|---|---|---|
| (I) | Polymer | 100 parts by weight |
| | Carbon black | 60 |
| | Paraffin oil | 20 |
| | ZnO | 5 |
| | Stearic acid | 1 |
| (II) | Soxinol ® TS*1 | 1 |
| | Soxinol ® M*2 | 0.25 |
| | Sulfur | 1 |

(I) was kneaded with Banbury mixer (Model BR) (started at a temperature of 70° C., for 5 minutes), and then (II) was added thereto and kneaded with 6 inches roll. The vulcanization was carried out by means of press at 160° C. for 15 minutes.
*1Vulcanization accelerator (tetramethyl-thiuram monosulfide) manufactured by Sumitomo Chemical Co., Ltd.
*2Vulcanization accelerator (2-mercapto-benzothiazole) manufactured by Sumitomo Chemical Co., Ltd.

It is apparent from the results that, according to the present invention, there can be provided an ethylene/propylene/nonconjugated polyene copolymer rubber rich in elastic character, sufficiently high in strength of copolymer and strength of vulcanized rubber and capable of satisfying the requirements concerning the high performances.

TABLE 2

| | | Example 1 | Example 2 | Comparative Example 2 | Comparative Example 3 |
|---|---|---|---|---|---|
| Rubber composition | Ethylene/Propylene (molar ratio) | 93/7 | 97/3 | 84/16 | 77/23 |
| | Content of (propylene + nonconjugated polyene) (% by mole) | 11.2 | 7.4 | 19.1 | 24 |
| | A value | 0.25 | 0.20 | 0.33 | 0.34 |
| | Intrinsic viscosity (dl/g) | 1.63 | 1.64 | 1.65 | 1.88 |
| | Melting peak temp. (°C.) | 42 | 41 | 40 | — |
| | Heat quantity of melting (cal/g) | 5.6 | 5.3 | 1.4 | — |
| Properties of raw rubber | Strength at break (kg/cm$^2$) | 150 | 390 | 50 | 50 |
| | Elongation at break (%) | 630 | 480 | 920 | >1,200 |
| | ML$_{1+4}$ 100° C. of Raw rubber | 84 | 85 | 81 | 90 |
| | ML$_{1+4}$ 100° C. of Compound | 81 | 83 | 79 | 95 |
| Properties of vulcanized product | 200% modulus (kg/cm$^2$) | 115 | 134 | 97 | 78 |
| | 300% modulus (kg/cm$^2$) | 186 | 201 | 167 | 132 |
| | Strength at break (kg/cm$^2$) | 261 | 272 | 239 | 227 |
| | Elongation at break (%) | 410 | 420 | 400 | 440 |
| | Hardness (JIS-A) | 85 | 88 | 74 | 70 |
| | Tear strength (kg/cm$^2$) | 64.6 | 67.5 | 53.9 | 53.0 |
| | Compression set (%) | | | | |
| | 125° C. × 22 hrs. | 50.7 | 51.2 | 48.9 | 54.5 |
| | −20° C. × 22 hrs. | 58.5 | 56.9 | 74.3 | 71.7 |
| | Embrittle temp. | −66° C. | −66° C. | −66° C. | <−70° C. |

EXAMPLES 3 TO 6 AND COMPARATIVE EXAMPLES 4 TO 7

Table 3 illustrates the characteristic properties of the copolymer rubbers used in these examples. Tables 4 and 5 illustrate formulations of the compositions and properties of vulcanized products.

In these examples, kneading was carried out in the following manner.

Thus, filler, oil and polymer were simultaneously put into a Banbury mixer having an inner volume of 1.5 liters (Model BR, manufactured by Kobe Steel, Ltd.) and kneaded at 12p for 5 minutes. The temperature at the start of kneading was 70° C., which ascended to 150° C. when kneading was completed. The vulcanizing agent and the vulcanization assistants were added by means of 10 inches open roll kept at 50° C. The vulcanization was carried out by the use of a steam press at 160° C. for 15 minutes with the formulation of Table 4 and at 160° C. for 20 minutes with the formulation of Table 5.

Properties of the vulcanized products were measured according to JIS K 6301. Compression set was measured at 125° C. for 22 hours. Oil resistance was evaluated by measuring volume swell percentage after immersion in JIS No. 3 oil at 150° C. for 70 hours. Heat resistance was evaluated by measuring the tensile properties after an aging at 120° C. for 5 days.

It is apparent from the results that, according to the present invention, there can be provided an ethylene/α-olefin copolymer rubber composition superior in physical properties, oil resistance and heat resistance of vulcanized product compared with the conventional ones.

TABLE 3

| | Ethylene copolymer rubber | | | |
|---|---|---|---|---|
| | A | B | C | D |
| Ethylene/Propylene (molar ratio) | 90/10 | 96/4 | 78/22 | 70/30 |
| Propylene + Polyene (% by mole) | 14.0 | 8.5 | 23.5 | 34.0 |
| Polyene used | 5-Ethylidene-2-norbornene | 5-Ethylidene-2-norbornene | 5-Ethylidene-2-norbornene | 5-Ethylidene-2-norbornene |
| Tg (°C.) | −35.0 | −31.3 | −54.0 | −54.5 |

TABLE 4

| | | Example | | Comparative Example | |
|---|---|---|---|---|---|
| | | 3 | 4 | 4 | 5 |
| Formulation of compositions (part by weight) | $ML_{1+4}$ 100° C. of Raw rubber | 80 | 82 | 77 | 75 |
| | $ML_{1+4}$ 100° C. of Compound | 79 | 81 | 79 | 79 |
| | Ethylene/Propylene/Polyene copolymer | A | B | C | D |
| | | 100 | 100 | 100 | 100 |
| | HAF carbon | 60 | 60 | 60 | 60 |
| | Paraffin oil | 20 | 20 | 20 | 20 |
| | Stearic acid | 1 | 1 | 1 | 1 |
| | Zinc oxide | 5 | 5 | 5 | 5 |
| | Soxinol ® TS *1 | 1 | 1 | 1 | 1 |
| | Soxinol ® M *2 | 0.25 | 0.25 | 0.25 | 0.25 |
| | Sulfur | 1 | 1 | 1 | 1 |
| Properties of vulcanized product | Tensile strength (kgf/cm$^2$) | 252 | 272 | 227 | 183 |
| | Elongation (%) | 410 | 420 | 440 | 380 |
| | Hardness (Hardness tester type A) | 80 | 88 | 70 | 70 |
| | Tear strength (kg-cm) | 60 | 68 | 53 | 49 |
| | Compression set, (Deformation (%) after 25% compression at 125° C. for 22 hrs.) | 50 | 51 | 55 | 49 |
| Oil resistance | Volume swell (%) after immersion in JIS No. 3 oil at 150° C. for 70 hrs. | 210 | 199 | 270 | 230 |
| Heat resistance after 120° C. × 5 days | Tensile strength (kgf/cm$^2$) | 253(100) | 273(100) | 206(91) | 174(95) |
| | Elongation (%) | 270(66) | 280(67) | 270(61) | 240(62) |
| | Hardness (A type tester) | 84(+4) | 90(+2) | 75(+5) | 77(+7) |

( ): Percent maintenance or change
*1: Vulcanization accelerator (tetramethyl-thiuram monosulfide) manufactured by Sumitomo Chemical Co., Ltd.
*2: Vulcanization accelerator (2-mercaptobenzothiazole) manufactured by Sumitomo Chemical Co., Ltd.

TABLE 5

| | | Example | | Comparative Example | |
|---|---|---|---|---|---|
| | | 5 | 6 | 6 | 7 |
| Formulation of compositions (part by weight) | Ethylene/Propylene/Polyene copolymer | A | B | C | D |
| | | 100 | 100 | 100 | 100 |
| | FEF black | 100 | 100 | 100 | 100 |
| | Paraffin oil | 80 | 80 | 80 | 80 |
| | Stearic acid | 1 | 1 | 1 | 1 |
| | Zinc oxide | 5 | 5 | 5 | 5 |
| | Soxinol ® BZ*1 | 1.0 | 1.0 | 1.0 | 1.0 |
| | Soxinol ® TRA*2 | 1.5 | 1.5 | 1.5 | 1.5 |
| | Soxinol ® TT*3 | 0.5 | 0.5 | 0.5 | 0.5 |
| | Soxinol ® M*4 | 3.0 | 3.0 | 3.0 | 3.0 |
| | Sulfur | 0.8 | 0.8 | 0.8 | 0.8 |
| Properties of vulcanized product | Tensile strength (kgf/cm$^2$) | 165 | 190 | 146 | 117 |
| | Elongation (%) | 340 | 370 | 450 | 250 |
| | Hardness (A type tester) | 72 | 82 | 67 | 67 |
| | Tear strength (kg-cm) | — | — | — | — |
| | Compression set (Deformation % after 25% compression at 120° C. for 22 hrs.) | 55 | 55 | 65 | 61 |
| Oil resistance | Volume swell (%) after immersion in JIS No. 3 oil at 100° C. for 70 hrs. | 82 | 86 | 120 | 90 |
| Heat resistance | Tensile strength (kgf/cm$^2$) | 155(94) | 191(101) | 136(93) | 98(84) |
| | Elongation (%) | 140(40) | 200(54) | 100(22) | 70(28) |

TABLE 5-continued

|  | Example | | Comparative Example | |
|---|---|---|---|---|
|  | 5 | 6 | 6 | 7 |
| Hardness (A type tester) | 80(+8) | 85(+3) | 90(+29) | 78(+9) |

( ): Percent maintenance or change
*¹Vulcanization accelerator manufactured by Sumitomo Chemical Co., Ltd. (zinc di-n-butyl dithiocarbamate)
*²Vulcanization accelerator manufactured by Sumitomo Chemical Co., Ltd. (dipentamethylenethiuram tetrasulfide)
*³Vulcanization accelerator manufactured by Sumitomo Chemical Co., Ltd. (tetramethylthiuram disulfide)
*⁴Vulcanization accelerator manufactured by Sumitomo Chemical Co., Ltd. (2-mercaptobenzothiazole)

EXAMPLES 7 AND 8 AND COMPARATIVE EXAMPLES 8 AND 9

Table 6 illustrates the characteristic properties of the copolymer rubbers used in these examples, and Table 7 illustrates the formulations of compositions and properties of vulcanized products.

The kneading was carried out in the following manner. Thus, filler, oil and polymer were simultaneously put into a Banbury mixer having an inner volume of 1.5 liters (Model BR, manufactured by Kobe Steel, Ltd.) and kneaded at 12p for 5 minutes. The temperature at the start of kneading was 70° C., which ascended to 150° C. when the kneading was completed. The vulcanizing agent and the vulcanization assistants were added by the use of a 10 inches open roll kept at 50° C. The vulcanization was carried out by means of a steam press at 160° C. for 20 minutes.

Properties of the vulcanized products were measured according to JIS K 6301. Compression set was measured at 120° C. for 22 hours. Oil resistance was evaluated by measuring volume swell percentage after immersion in JIS No. 3 oil at 100° C. for 70 hours. Heat resistance was evaluated by measuring tensile properties after a thermal aging at 150° C. for 7 days.

It is apparent from the results that, according to the present invention, there can be provided an ethylene/α-olefin copolymer rubber superior to those of prior art in physical properties, oil resistance and heat resistance of vulcanized product.

TABLE 6

|  | Ethylene copolymer rubber | | | |
|---|---|---|---|---|
|  | A | B | C | D |
| Ethylene/Propylene (molar ratio) | 90/10 | 96/4 | 78/22 | 70/30 |
| Propylene + Polyene (% by mole) | 14.0 | 8.5 | 23.5 | 34.0 |
| Polyene used | 5-Ethylidene-2-norbornene | 5-Ethylidene-2-norbornene | 5-Ethylidene-2-norbornene | 5-Ethylidene-2-norbornene |
| Tg (°C.) | −35.0 | −31.3 | −54.0 | −54.5 |

TABLE 7

|  |  | Example | | Comparative Example | |
|---|---|---|---|---|---|
|  |  | 7 | 8 | 8 | 9 |
| Formulations of compositions (part by weight) | Ethylene copolymer rubber | A | B | C | D |
|  |  | 100 | 100 | 100 | 100 |
|  | FEF black | 100 | 100 | 100 | 100 |
|  | Aroma oil *1 | 80 | 80 | 80 | 80 |
|  | Stearic acid | 1 | 1 | 1 | 1 |
|  | Zinc oxide | 5 | 5 | 5 | 5 |
|  | Soxinol ® BZ | 1.0 | 1.0 | 1.0 | 1.0 |
|  | Soxinol ® TRA | 1.5 | 1.5 | 1.5 | 1.5 |
|  | Soxinol ® TT | 0.5 | 0.5 | 0.5 | 0.5 |
|  | Soxinol ® M | 3.0 | 3.0 | 3.0 | 3.0 |
|  | Sulfur | 0.8 | 0.8 | 0.8 | 0.8 |
| Properties of vulcanized product | Tensile strength (kgf/cm²) | 163 | 180 | 140 | 110 |
|  | Elongation (%) | 530 | 520 | 420 | 210 |
|  | Hardness (type A tester) | 69 | 77 | 65 | 65 |
|  | Compression set (Deformation (%) after 25% compression at 120° C. for 22 hrs.) | 57 | 55 | 69 | 63 |
| Oil resistance | Volume swell (%) after immersion in JIS No. 3 oil at 100° C. for 70 hrs. | 80 | 83 | 132 | 95 |
| Heat resistance after 150° C. × 7 days | Tensile strength (kgf/cm²) | 156(96) | 178(99) | 129(92) | 88(80) |
|  | Elongation (%) | 240(45) | 280(53) | 80(20) | 50(25) |
|  | Hardness (type A tester) | 77(+8) | 80(+3) | 92(+27) | 75(+10) |

( ): Percent maintenance or change
*1: Kyoseki process X-100, manufactured by Kyodo Sekiyu K.K. for an aroma type process oil

EXAMPLES 9 AND 10 AND COMPARATIVE EXAMPLES 10 TO 12

Table 8 illustrates the characteristic properties of the ethylene/propylene/nonconjugated polyene copolymers used in these examples, and Table 9 illustrates the formulations of compositions and the properties of vulcanized products.

Kneading was carried out in the following manner.

Thus, polymer was firstly put into a Banbury mixer having an inner volume of 1.5 liters (Model ER, manufactured by Kobe Steel, Ltd.) and kneaded alone for 30 seconds, after which filler and oil were added and the mixture was kneaded at 12p for 4.5 minutes. The temperature at the start of kneading was 70° C., which ascended to 170° C. when the kneading was completed. The vulcanizing agent and the vulcanization assistants were added by the use of a 10 inches open roll kept at 50° C. The vulcanization was carried out by means of a steam press at 160° C. for 10 minutes.

Properties of the vulcanized products were measured according to JIS K 6301.

It is apparent from the results that, according to the invention, there can be provided a covulcanizable rubber composition superior to those of prior art in properties such as tensile strength, bending resistance, etc.

introducing steam into the jacket. The vulcanization was carried out at 170° C. for 20 minutes.

Properties of vulcanized products were measured according to JIS K 6301. Compression set was measured at 100° C. for 22 hours. Heat resistance was evaluated by measuring tensile properties after 3 days at 150° C.

The surface stickiness (state of vulcanization) of vulcanized products was evaluated in the following manner. Thus, a square bleached cotton cloth ("sarashi") of about 40 mm square was impregnated with 10 ml of toluene. While applying a load of 75 kg/cm onto the

TABLE 8

| | Ethylene copolymer rubber | | | |
|---|---|---|---|---|
| | A | B | C | D |
| Ethylene/Propylene (molar ratio) | 86/14 | 93/7 | 69/31 | 65/35 |
| Propylene + Polyene (% by mole) | 18 | 11 | 35 | 37 |
| Polyene used | 5-Ethylidene-2-norbornene | 5-Ethylidene-2-norbornene | 5-Ethylidene-2-norbornene | 5-Ethylidene-2-norbornene |

TABLE 9

| | | Example | | Comparative Example | | |
|---|---|---|---|---|---|---|
| | | 9 | 10 | 10 | 11 | 12 |
| Formulations of compositions (part by weight) | Natural rubber | 50 | 50 | 50 | 50 | 50 |
| | Butadiene rubber *1 | 20 | 20 | 20 | 20 | 50 |
| | Ethylene/Propylene/Non-conjugated polyene copolymer | A 30 | B 30 | C 30 | D 30 | — |
| | GPF carbon | 50 | 50 | 50 | 50 | 50 |
| | Naphthene oil | 12 | 12 | 12 | 12 | 12 |
| | Stearic acid | 1 | 1 | 1 | 1 | 1 |
| | Zinc oxide | 3 | 3 | 3 | 3 | 3 |
| | Soxinol ® NBS *2 | 1.0 | 1.0 | 1.0 | 1.0 | 1.0 |
| | Sulfur | 1.75 | 1.75 | 1.75 | 1.75 | 1.75 |
| Properties of vulcanized product | Tensile strength (kgf/cm$^2$) | 180 | 175 | 161 | 147 | 177 |
| | Elongation (%) | 600 | 520 | 570 | 570 | 600 |
| | Hardness (JIS-A) | 61 | 67 | 57 | 55 | 55 |
| Flexing test | Crack length at: | | | | | |
| (de Mattia machine, growth method, room temp.) | 100,000 flexes (mm) | 5.7 | 4.2 | 6.0 | 9.3 | 3.9 |
| | 200,000 flexes (mm) | 6.4 | 5.9 | 10.6 | 14< | 5.4 |
| | 300,000 flexes (mm) | 6.7 | 7.4 | 11.8 | 14< | 6.5 |
| Ozone resistance (Static method at 50% elongation, 100 pphm O$_3$) | After 5 hrs. at 45° C. | No crack | No crack | No crack | No crack | C-2 *3 |

*1: Butadiene rubber BR-01, manufactured by Japan Synthetic Rubber Co., Ltd.
*2: Vulcanization accelerator (N-oxydiethylene-benzothiazyl sulfenamide) manufactured by Sumitomo Chemical Co., Ltd.
*3: Many cracks detectable by the naked eye

EXAMPLES 11 TO 13 AND COMPARATIVE EXAMPLES 13 TO 15

Table 10 illustrates the characteristic properties of the copolymer rubbers used in these examples, and Table 11 illustrates the formulations of compositions and the properties of vulcanized products wherein formulations are expressed by "parts by weight" per 100 parts by weight of the copolymer. Kneading and vulcanization were carried out in the following manner.

Thus, filler, oil and polymer were simultaneously put into a Banbury mixer having an inner volume of 1.5 liters (Model BR, manufactured by Kobe Steel, Ltd.) and kneaded at 12p for 5 minutes. The temperature was 70° C. at the start of kneading, which ascended to 150° C. when the kneading was completed.

Peroxide and crosslinking assistants were added by the use of 10 inches open roll kept at 50° C.

The vulcanization was carried out in a jacketed vulcanizer, and a hot air vulcanization was performed by cloth, the cloth was shifted on the surface of rubber sample for a distance of 100 mm at a speed of 25 mm/second, after which the state of surface of the bleached cotton cloth was visually examined. When the surface of vulcanized product was sticky, copolymer rubber or filler adhered to the cloth by the action of toluene. Surface stickiness of vulcanized product was evaluated on the basis of the state of their adherence.

The results of these examples demonstrate that the composition of the present invention exhibits an excellent heat resistance and particularly shows an excellent compression set without any surface stickiness even when vulcanized by a process worked in the presence of air.

EXAMPLES 14 to 17 AND COMPARATIVE EXAMPLE 16

Table 10 illustrates the characteristic properties of the copolymer rubbers used in these examples, and Table 12 illustrates the formulations of compositions and the properties of vulcanized products wherein formulation is expressed by "parts by weight" per 100 parts by weight of the copolymer.

The kneading was carried out in the same manner as in Examples 11 to 13.

The vulcanization was carried out in a jacketed vulcanizer by the method of hot air vulcanization while introducing steam into the jacket. Further, air was introduced into the inner space of vulcanizer, and pressure of the hot air was varied as shown in Table 12 to perform vulcanization. The condition of vulcanization was at 160° C. for 15 minutes.

Properties of the vulcanized products were measured according to JIS K 6301. Compression set was measured at 100° C. for 22 hours. Heat resistance was evaluated by measuring tensile properties after 7 days at 150° C.

Surface stickiness (state of vulcanization) of vulcanized products was evaluated in the same manner as in Examples 11 to 13.

The results of these examples demonstrate that the composition of the present invention exhibits its effect without any restriction by air pressure or the like.

It is apparent from the results that, according to the present invention, there can be provided a rubber composition vulcanizable in the presence of oxygen which exhibits no surface stickiness and has excellent tensile strength, heat resistance, compression set, etc. after vulcanization.

TABLE 10

|  | Copolymer A | Copolymer B | Copolymer C | Copolymer D | Copolymer E | Copolymer F |
|---|---|---|---|---|---|---|
| Ethylene/Propylene (molar ratio) | 96.6/3.4 | 93.3/6.7 | 89.5/10.5 | 93.1/6.9 | 57.8/42.2 | 78.6/21.4 |
| Polyene (% by mole) | 3.2 | 3.6 | 3.2 | 4.0 | 4.4 | 1.1 |
| Propylene + Polyene (% by mole) | 6.5 | 10.0 | 13.4 | 10.6 | 44.6 | 22.3 |
| Polyene used | DCPD[*1] | DCPD[*1] | DCPD[*1] | ENB[*2] | ENB[*2] | ENB[*2] |
| A value | 0.166 | 0.217 | 0.251 | 0.232 | 0.588 | 0.320 |

[*1] dicyclopentadiene
[*2] 5-ethylidene-2-norbornene

TABLE 11

|  |  | Example 11 Copolymer A | Example 12 Copolymer B | Example 13 Copolymer C | Comparative Example 13 Copolymer F | Comparative Example 14 Copolymer E | Comparative Example 15 Copolymer A |
|---|---|---|---|---|---|---|---|
| Formulation of compositions (part by weight) | Seast ® 3 *1 | 60 | 60 | 60 | 60 | 60 | 60 |
|  | PW-380 *2 | 20 | 20 | 20 | 20 | 20 | 20 |
|  | ZnO | 5 | 5 | 5 | 5 | 5 | 6 |
|  | Stearic acid | — | — | — | — | — | 1 |
|  | Dicumyl peroxide | 4 | 4 | 4 | 4 | 4 | — |
|  | Soxinol ® TS *3 | — | — | — | — | — | 1.5 |
|  | Soxinol ® M *3 | — | — | — | — | — | 0.5 |
|  | Sulfur | — | — | — | — | — | 1.5 |
| Properties of vulcanized product | Tensile strength (kgf/cm$^2$) | 104 | 94 | 104 | 131 | 20 | 274 |
|  | Elongation (%) | 170 | 140 | 190 | 260 | 100 | 310 |
|  | Hardness (JIS-A) | 82 | 75 | 68 | 59 | 49 | 87 |
|  | Compression set (%) | 1.6 | 1.2 | 1.6 | 3.8 | 1.5 | 35.6 |
| Heat resistance 150° C. × 3 days | Maintenance of strength (%) | 48 | 58 | 60 | 46 | 140 | 54 |
|  | Maintenance of elongation (%) | 29 | 28 | 32 | 69 | 50 | 19 |
|  | Change in hardness | +3 | +9 | +9 | +3 | +27 | +5 |
|  | State of surface vulcanization *6 | ○ | ○ | ○ | x | x | ○ |

TABLE 12

|  |  | Example 14 Copolymer D | Example 15 Copolymer D | Example 16 Copolymer D | Example 17 Copolymer D | Comparative Example 16 Copolymer E |
|---|---|---|---|---|---|---|
| Formulation of compositions (part by weight) | Seast ® 3*1 | 80 | 80 | 80 | 80 | 80 |
|  | PW-380*2 | 40 | 40 | 40 | 40 | 40 |
|  | ZnO | 5 | 5 | 5 | 5 | 5 |
|  | Stearic acid | 1 | 1 | 1 | 1 | 1 |
|  | Perhexa 3M*4 | 4 | 4 | 4 | 4 | 4 |
|  | TAIC*5 | 2 | 2 | 2 | 2 | 2 |
|  | Hot air pressure (kg/cm$^2$-G) | 0 | 1 | 4 | 6 | 0 |
| Properties of vulcanized product | Tensile strength (kgf/cm$^2$) | 143 | 144 | 144 | 148 | 120 |
|  | Elongation (%) | 130 | 140 | 140 | 150 | 250 |
|  | Hardness (JIS-A) | 80 | 80 | 78 | 79 | 70 |
| Heat resistance 150° C. × 7 days | Maintenance of strength (%) | 84 | 89 | 61 | 57 | 50 |
|  | Maintenance of elongation (%) | 69 | 64 | 53 | 47 | 70 |
|  | Change in | +4 | +5 | +7 | +6 | +3 |

TABLE 12-continued

|  | Example 14 Copolymer D | Example 15 Copolymer D | Example 16 Copolymer D | Example 17 Copolymer D | Comparative Example 16 Copolymer E |
| --- | --- | --- | --- | --- | --- |
| hardness |  |  |  |  |  |
| State of surface vulcanization*6 | ◯ | ◯ | ◯ | ◯ | x |

Notes to Table 11 and Table 12
*[1] HAF carbon manufactured by Tokai Carbon Co., Ltd.
*[2] Paraffin oil manufactured by Idemitsu Sekiyu Kagaku K. K.
*[3] Vulcanization accelerators manufactured by Sumitomo Chemical Co., Ltd.
*[4] 1,1-Bis(t-butylperoxy)-3,3,5-trimethylcyclohexane manufactured by Nippon Oil & Fats Co., Ltd.
*[5] Triallyl isocyanurate manufactured by Nippon Kasei Chemical Co., Ltd.
*[6] ◯ - Deposition of carbon or polymer is hardly noticeable on the bleached cotton cloth
x - Deposition of carbon or polymer is noticed.

EXAMPLE 18

Into a 10 liter autoclave made of stainless steel and equipped with a stirrer, hexane (12 kg/hour), ethylene (0.42 kg/hour), propylene (0.59 kg/hour) and 5-ethylidene-2-norbornene (hereinafter referred to as ENB) (0.09 kg/hour) were fed at the mentioned rates from the bottom part of the autoclave and hydrogen was fed at a rate of 0.112% by mole. Further, as catalyst, ethylaluminum sesquichloride, vanadium oxytrichloride and n-butyl perchlorocrotonate were continuously fed at a rate of 0.54 g/hour, 0.036 g/hour and 0.18 g/hour, respectively.

Polymerization reaction was carried out in the state of homogeneous solution at a temperature of 50° C. The reacted liquid mixture was continuously withdrawn. After adding a polymerization stopper thereto, the resulting copolymer was deposited by steam stripping and then dried.

Thus, a copolymer was obtained in a yield of 380 g/hour.

COMPARATIVE EXAMPLE 17

A polymerization reaction was carried out in the same manner as in Example 18, except that hexane, ethylene, propylene and ENB were fed at a rate of 12 kg/hour, 0.46 kg/hour, 0.65 kg/hour and 0.04 kg/hour, respectively. Hydrogen was fed at a rate of 0.098% by mole.

As catalyst components, ethylaluminum sesquichloride, vanadium oxytrichloride and n-butyl perchlorocrotonate were fed at a rate of 0.54 g/hour, 0.036 g/hour and 0.18 g/hour, respectively. The polymerization temperature was 50° C.

Thus, a copolymer was obtained in a yield of 420 g/hour.

COMPARATIVE EXAMPLE 18

A polymerization reaction was carried out in the same manner as in Example 18, except that hexane, ethylene, propylene and ENB were fed at a rate of 14 kg/hour, 0.49 kg/hour, 0.69 kg/hour and 0.003 kg/hour, respectively. Hydrogen was fed at a rate of 0.085% by mole.

As catalyst components, ethylaluminum sesquichloride, vanadium oxytrichloride and n-butyl perchlorocrotonate were fed at a rate of 0.44 g/hour, 0.029 g/hour and 0.14 g/hour, respectively. The polymerization temperature was 50° C.

Thus, a copolymer was obtained in a yield of 420 g/hour.

EXAMPLE 19

Into a 10 liter autoclave made of stainless steel and equipped with a stirrer, hexane (10 kg/hour), ethylene (0.46 kg/hour), propylene (0.69 kg/hour) and dicyclopentadiene (hereinafter referred to as DCPD) (0.16 kg/hour) were fed at the mentioned rates from the bottom part of the autoclave and hydrogen was fed at a rate of 4.9 nl/hour. Further, as catalyst, ethylaluminum sesquichloride, vanadium oxytrichloride and n-butyl perchlorocrotonate were continuously fed at a rate of 0.94 g/hour, 0.063 g/hour and 0.32/hour, respectively.

Polymerization reaction was carried out in the state of homogeneous solution at a temperature of 50° C. The reacted liquid mixture was continuously withdrawn. After adding a polymerization stopper thereto, the resulting copolymer was deposited by steam stripping and then dried.

Thus, a copolymer was obtained in a yield of 490 g/hour.

COMPARATIVE EXAMPLE 19

A polymerization reaction was carried out in the same manner as in Example 19, except that hexane, ethylene, propylene and DCPD were fed at a rate of 11 kg/hour, 0.56 kg/hour, 0.94 kg/hour and 0.05 kg/hour, respectively. Hydrogen was fed at a rate of 3.0 nl/hour.

As catalyst components, ethylaluminum sesquichloride, vanadium oxytrichloride and n-butyl perchlorocrotonate were fed at a rate of 1.18 g/hour, 0.078 g/hour and 0.39 g/hour, respectively The polymerization temperature was 50° C.

Thus, a copolymer was obtained in a yield of 527 g/hour.

COMPARATIVE EXAMPLE 20

A polymerization reaction was carried out in the same manner as in Example 19, except that hexane, ethylene, propylene and DCPD were fed at a rate of 11 kg/hour, 0.58 kg/hour, 0.95 kg/hour and 0.02 kg/hour, respectively. Hydrogen was fed at a rate of 2.7 nl/hour.

As catalyst components, ethylaluminum sesquichloride, vanadium oxytrichloride and n-butyl perchlorocrotonate were fed at a rate of 1.00 g/hour, 0.066 g/hour and 0.33 g/hour, respectively. The polymerization temperature was 50° C.

Thus, a copolymer was obtained in a field of 535 g/hour.

COMPARATIVE EXAMPLE 21

The same polymerization reaction was repeated as in Example 19 except that hexane, ethylene, propylene and DCPD were fed at a rate of 11 kg/hour, 0.58 kg/hour, 1.35 kg/hour and 0.14 kg/hour, respectively. Hydrogen was fed at a rate of 2.4 nl/hour. As catalyst components, ethylaluminum sesquichloride, vanadium oxytrichloride and n-butylperchlorocrotonate were fed at a rate of 4.5 g/hour, 0.3 g/hour and 1.5 g/hour, respectively. The polymerization temperature was 50° C. Thus, a copolymer was obtained in a yield of 647 g/hour.

The copolymers obtained in Examples 18 and 19 and Comparative Examples 18 to 21 were formulated and vulcanized, the proportions of constituents of which are shown in Table 13, and the properties of vulcanized products were measured.

The results of the measurements are summarized in Table 14 and 15.

TABLE 13

| | | |
|---|---|---|
| (I) | Polymer | 100 parts by weight |
| | Carbon black | 60 |
| | Paraffin oil | 20 |
| | ZnO | 5 |
| | Stearic acid | 1 |
| | Soxinol ® TS*1 | 1 |

TABLE 13-continued

| | | |
|---|---|---|
| (II) | Soxinol ® M*2 | 0.25 |
| | Sulfur | 1 |

1 (I) was kneaded with Banbury mixer (Model BR) (started at a temperature of 70° C., for 5 minutes), and then (II) was added thereto and kneaded with 6-inches roll.
*1 Vulcanization accelerator (tetramethyl-thiuram monosulfide) manufactured by Sumitomo Chemical Co., Ltd.
*2 Vulcanization accelerator (2-mercapto-benzothiazole) manufactured by Sumitomo Chemical Co., Ltd.

TABLE 14

| | | Example 18 | Comparative Example 17 | Comparative Example 18 |
|---|---|---|---|---|
| Rubber composition | Copolymer | G | H | I |
| | Ethylene/Propylene (molar ratio) | 86.5/9.6 | 88.4/9.8 | 89.6/9.9 |
| | Content of (propylene + nonconjugated polyene) (% by mole) | 13.4 | 12.0 | 9.9 |
| | A value | 0.30 | 0.20 | 0.16 |
| | Intrinsic viscosity (dl/g) | 1.65 | 1.76 | 2.00 |
| | Melting peak temp. (°C.) | 47.3 | 52.9 | 61.1 |
| | Heat quantity of melting (cal/g) | 5.8 | 11.2 | 10.6 |
| Physical properties | $ML_{1+4}$ 100° C. of Raw rubber | 81 | 79 | 78 |
| | ENB content (mol %) | 3.9 | 1.8 | 0.45 |

TABLE 15

| | | Example 19 | Comparative Example 19 | Comparative Example 20 | Comparative Example 21 |
|---|---|---|---|---|---|
| Rubber composition | Copolymer | J | K | L | M |
| | Ethylene/Propylene (molar ratio) | 86.1/10.0 | 87.5/11.2 | 87.2/11.9 | 77.5/19.7 |
| | Content of (propylene + nonconjugated polyene) (% by mole) | 13.9 | 12.5 | 12.8 | 22.5 |
| | A value | 0.28 | 0.21 | 0.20 | 0.35 |
| | Intrinsic viscosity (dl/g) | 1.35 | 1.72 | 1.74 | 1.58 |
| | Melting peak temp. (°C.) | 46.7 | 46.0 | 47.2 | 45.0 |
| | Heat quantity of melting (cal/g) | 0.2 | 6.3 | 7.6 | 0.45 |
| Physical properties | $ML_{1+4}$ 100° C. of Raw rubber | 89 | 92 | 85 | 94 |
| | DCPD content (mol %) | 3.9 | 1.3 | 0.86 | 2.77 |

EVALUATION OF ROLL PROCESSABILITY

With each of the thus obtained rubber compositions in Examples 18 and 19 and Comparative Examples 17 to 20, the roll-processability was examined as follows:

A pair of rolls having a diameter of 6 inches and a space therebetween of 1.5 mm was controlled at a prescribed temperature (40° C., 60° C. and 80° C., within ±1° C.). 300 Grams of each composition sample were kneaded with the rolls. The necessary time that the composition was sufficiently wound around the rolls was determined and the winding state was observed.

Table 16 shows the results.

TABLE 16

| | | 40° C. | | 60° C. | | 80° C. | |
|---|---|---|---|---|---|---|---|
| | | Time | State | Time | State | Time | State |
| Example 18 | Rubber composition G | 5 sec | Good | 5 sec | Good | 5 sec | Good |
| Comp. Ex. 17 | Rubber composition H | 44 sec | Good | 10 sec | Good | 30 sec | Bad* |
| Comp. Ex. 18 | Rubber composition I | 90 sec or more | Bad* | 90 sec or more | Bad* | 90 sec or more | Bad* |
| Example 19 | Rubber composition J | 7 sec | Good | 13 sec | Good | 20 sec | Good |
| Comp. | Rubber | 150 | Bad* | 150 | Bad* | 150 | Bad* |

TABLE 16-continued

|  | | 40° C. | | 60° C. | | 80° C. | |
|---|---|---|---|---|---|---|---|
|  | | Time | State | Time | State | Time | State |
| Ex. 19 | composition | sec or more | | sec or more | | sec or more | |
| Comp. Ex. 20 | Rubber composition L | 150 sec or more | Bad* | 150 sec or more | Bad* | 150 sec or more | Bad* |

*The processability was bad and bagging was caused, or the rubber composition does not wind around rolls.

EVALUATION OF TEAR STRENGTH

Compositions were prepared by using Copolymers J (Example 19) and M (Example 21), respectively. The compositions were formed into sheets of vulcanized rubber with steam press at 160° C. for 15 min. The sheets were cut into samples having a shape called JIS B. The tensile strength of the sheets was determined according to JIS K-6301. Table 17 shows the results.

TABLE 17

|  | Example 19 | Example 21 |
|---|---|---|
| Copolymer used | Copolymer J | Copolymer M |
| Tear strength (mgf/cm) | 45.0 | 39.9 |

What is claimed is:

1. A vulcanizable rubber composition comprising a copolymer rubber constituted of ethylene, propylene and 5-ethylidene-2-norbornene and/or dicyclopentadiene, wherein ethylene/propylene molar ratio is 86/14 to 97/3, the total content of propylene and 5-ethylidene-2-norbornene and/or dicyclopentadiene is 6 to 30% by mole, the content of 5-ethylidene-2norbornene and/or dicyclopentadiene is 3 to 6% by mole, wherein the ratio of the contents of the ingredients (A) is defined by the following equation:

$$A = \frac{42P + 120D}{42P + 120D + 28E}$$

wherein each of P, D and E represents the content (% by mole) of propylene, 5-ethylidene-2-norbornene and/or dicyclopentadiene and ethylene, respectively, in the copolymer of $A \geqq 0.1$, and said copolymer rubber has an intrinsic viscosity of 0.8 to 4.0 dl/g as measured at 70° C. in xylene, a melting peak temperature of 70° C. or below and a heat quantity of melting of 10 cal/g or below as measured with a differential scanning calorimeter and a process oil in an amount of 10 to 150 parts by weight per 100 parts by weight of the copolymer rubber.

2. A vulcanizable rubber composition according to claim 1 comprising an inorganic filler and/or carbon black in an amount of 20 to 400 parts by weight per 100 parts by weight of the copolymer rubber.

3. A vulcanizable rubber composition according to claim 1 comprising an inorganic filler and/or carbon black in an amount of 40 to 150 parts by weight per 100 parts by weight of the copolymer rubber.

4. A vulcanizable rubber composition according to claim 1 comprising a conjugated diene polymer and/or a copolymer of conjugated diene and u-olefin or an aromatic vinyl compound.

5. A vulcanizable rubber composition according to claim 1 comprising at least one rubber selected from the group consisting of butadiene rubber, isoprene rubber, natural rubber, styrene-butadiene rubber and nitrile-butadiene rubber.

6. A vulcanizable rubber composition according to claim 1 comprising natural rubber and/or butadiene rubber.

7. A vulcanizable rubber composition according to claim 4, wherein the content of said conjugated diene polymer and/or copolymer of conjugated diene and α-olefin or an aromatic vinyl compound is 1 to 250 parts by weight per 100 parts by weight of the copolymer rubber.

8. A vulcanizable rubber composition according to claim 1 comprising an organic peroxide.

9. A vulcanizable rubber composition according to claim 8, wherein said organic peroxide is at least one member selected from the group consisting of 1,1-bis(t-butylperoxy)-3,3,5-trimethylcyclohexane, dicumyl peroxide, di-t-butylperoxide, t-butylperoxycumene, benzoyl peroxide and 2,5-dimethyl-2,5-di(t-butylperoxy)-hexane.

10. A vulcanizable rubber composition according to claim 8, wherein the content of said organic peroxide is 0.5 to 20 parts by weight per 100 parts by weight of the copolymer rubber.

11. A vulcanizable rubber composition according to claim 8, wherein the content of said organic peroxide is 1 to 10 parts by weight per 100 parts by weight of the copolymer rubber.

* * * * *